(12) United States Patent
Grumet et al.

(10) Patent No.: US 11,276,270 B2
(45) Date of Patent: Mar. 15, 2022

(54) METHOD FOR TRANSMITTING ENTERTAINMENT GAMING SESSIONS BETWEEN TERMINALS

(71) Applicant: NOVOMATIC AG, Gumpoldskirchen (AT)

(72) Inventors: Matthias Grumet, Gumpoldskirchen (AT); Michael Kusternig, Gumpoldskirchen (AT); Ralf Rollmann, Gumpoldskirchen (AT)

(73) Assignee: NOVOMATIC AG, Gumpoldskirchen (AT)

( * ) Notice: Subject to any disclaimer, the term of this patent is extended or adjusted under 35 U.S.C. 154(b) by 809 days.

(21) Appl. No.: 16/071,281

(22) PCT Filed: Jan. 13, 2017

(86) PCT No.: PCT/IB2017/050181
§ 371 (c)(1),
(2) Date: Jul. 19, 2018

(87) PCT Pub. No.: WO2017/125838
PCT Pub. Date: Jul. 27, 2017

(65) Prior Publication Data
US 2021/0201623 A1    Jul. 1, 2021

(30) Foreign Application Priority Data
Jan. 23, 2016   (EP) .................................. 16000161

(51) Int. Cl.
*G07F 17/32* (2006.01)
(52) U.S. Cl.
CPC ...... *G07F 17/3223* (2013.01); *G07F 17/3237* (2013.01); *G07F 17/3241* (2013.01)

(58) Field of Classification Search
CPC ............. G07F 17/3223; G07F 17/3241; G07F 17/3225
(Continued)

(56) References Cited

U.S. PATENT DOCUMENTS

| | | | |
|---|---|---|---|
| 8,764,555 B2 * | 7/2014 | Quan | A63F 13/49 463/24 |
| 8,800,007 B1 * | 8/2014 | Rajagopalan | H04L 9/083 726/5 |

(Continued)

FOREIGN PATENT DOCUMENTS

| | | |
|---|---|---|
| WO | 0030729 A1 | 6/2000 |
| WO | 2014052259 A1 | 4/2014 |

OTHER PUBLICATIONS

European Search Report dated Jun. 28, 2016 for European Application No. EP16000161 filed Jan. 23, 2016.
(Continued)

*Primary Examiner* — Chase E Leichliter
(74) *Attorney, Agent, or Firm* — Blue Filament Law PLLC

(57) ABSTRACT

A method for transmitting an amusement game session between client units in a server-based amusement game system includes a server unit and at least two client units. Here, connections between the server unit and the at least two client units are set up via a communication network. The identification (ID1) of the first client unit is entered into the second client unit. A communication connection to the server unit is established from the second client unit, whereas an identification of the second client unit is sent to the server unit and stored together with the user-specific data. The amusement game session is displayed on the second client unit and the identification of the first client unit is deleted from the user-specific data. The amusement game (Continued)

Figure 1:
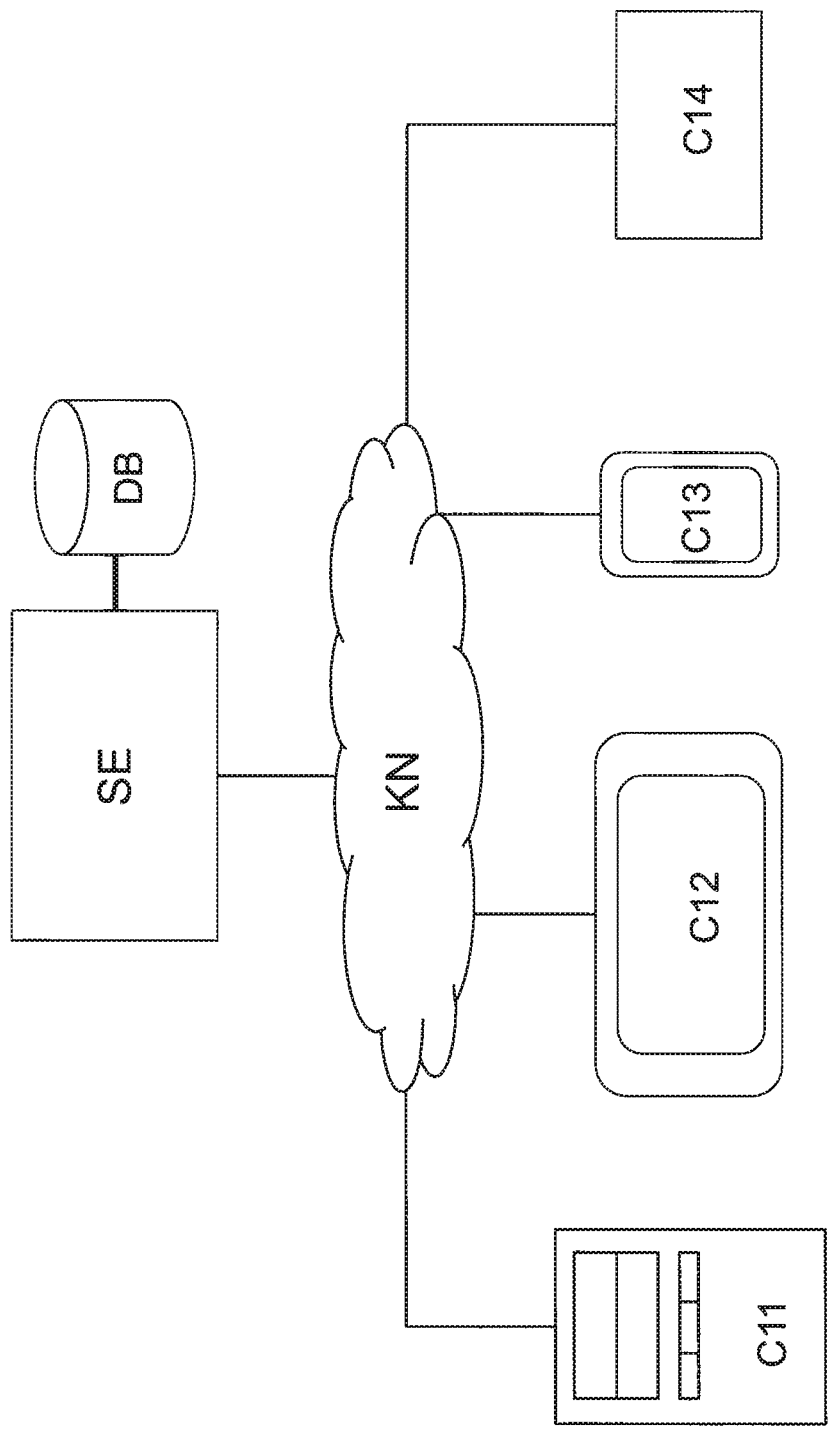

session can then be seamlessly continued on the second client unit (C22) at the same status.

20 Claims, 2 Drawing Sheets

(58) Field of Classification Search
USPC .......................................................... 463/42
See application file for complete search history.

(56) References Cited

U.S. PATENT DOCUMENTS

| | | | | |
|---|---|---|---|---|
| 9,659,437 | B2* | 5/2017 | Kelly | G07F 17/3223 |
| 2007/0021198 | A1* | 1/2007 | Muir | G07F 17/3262 |
| | | | | 463/29 |
| 2008/0300049 | A1* | 12/2008 | Anderson | G07F 17/3267 |
| | | | | 463/25 |
| 2009/0063690 | A1* | 3/2009 | Verthein | H04L 67/142 |
| | | | | 709/228 |
| 2010/0285878 | A1* | 11/2010 | Tarantino | G07F 17/3239 |
| | | | | 463/36 |
| 2011/0151979 | A1* | 6/2011 | Boesen | G07F 17/32 |
| | | | | 463/43 |
| 2012/0042000 | A1 | 2/2012 | Heins et al. | |
| 2012/0083331 | A1* | 4/2012 | Carpenter | G07F 17/3286 |
| | | | | 463/25 |
| 2013/0203489 | A1* | 8/2013 | Lyons | G07F 17/3211 |
| | | | | 463/30 |
| 2013/0203490 | A1* | 8/2013 | Hilbert | G07F 17/3225 |
| | | | | 463/30 |
| 2013/0318249 | A1* | 11/2013 | McDonough | H04L 63/08 |
| | | | | 709/228 |
| 2014/0094272 | A1* | 4/2014 | Kelly | G07F 17/3225 |
| | | | | 463/25 |
| 2014/0122730 | A1* | 5/2014 | Burch | H04L 63/0807 |
| | | | | 709/228 |
| 2014/0135105 | A1* | 5/2014 | Quan | H04L 67/1095 |
| | | | | 463/24 |
| 2014/0359709 | A1* | 12/2014 | Nassar | H04L 65/1083 |
| | | | | 726/4 |
| 2015/0228153 | A1* | 8/2015 | Hedrick | G06Q 20/3223 |
| | | | | 463/25 |
| 2016/0019746 | A1* | 1/2016 | Lyons | G07F 17/3211 |
| | | | | 463/25 |

OTHER PUBLICATIONS

International Search Report dated May 26, 2017 for International Application No. PCT/IB2017/050181 filed Jan. 13, 2017.

* cited by examiner

METHOD FOR TRANSMITTING ENTERTAINMENT GAMING SESSIONS BETWEEN TERMINALS

TECHNICAL FIELD

The present invention pertains to a transfer method of an amusement game session among several terminals or client devices in a server-based amusement game system. The server-based amusement game system in this case comprises at least one server unit and at least two devices as client devices, wherein connections between the server unit and the client units or terminals are established via a communications network.

STATE OF THE ART

In the past, amusement machines were usually operated as so-called stand-alone gaming devices on which any necessary gaming operation functions and data (game logic, random generator, etc.) were available. These devices were mostly in the form of monetary value terms-operated slot machines and/or gambling devices. Thanks to new game ideas, such as progressive jackpots, multi-player games, etc., amusement machines started to be networked at least at a local level (e.g. via local networks). Safety and player protection regulations as well as the use of central systems, such as e.g. casino management systems, billing systems, customer data management facilities, etc. allowing to store e.g. user data, user profiles, user accounts, billing information, etc. for a single gambling session and/or allowing to control and check a gambling operation, additionally led to further mostly local or regional networking (e.g. operator-specific) of amusement machines via a communication network.

Due to the introduction of central computer systems in the area of amusement machines—mainly due to cost efficiency reasons and the simplification of configuration management—so-called server-based amusement game systems were created, such as the amusement game system described in document WO 00/30729 A1. A server-based amusement game system is based on the so-called client-server concept, where tasks and services within a communication network get distributed among different units—i.e. at least one server and/or one server unit and at least one client and/or client unit. These units (server unit and client units) usually run on different devices (e.g. processor units), which are frequently physically separated but mutually connectable via the communication network (e.g. local area network, wide area network, etc.). An established connection of a client unit with a server unit is called a session throughout, whereas a session starts upon login and ends upon logout.

For a server-based amusement game system, the server unit is formed by a central computer system, whereas the entire amusement game contents or at least an integral share of the amusement game contents (e.g. game logic and graphics, random generator, etc.) is stored centrally on a server unit. A central server unit or associated database unit can store additional data contents for e.g. client unit administration, client unit authorizations, authentication of users and/or player protection measures (e.g. player account, user profile, etc.) or additional data. It is then usually possible to establish a connection to the server unit from the client units following login and/or authorization, thus allowing to request the desired amusement games, such as e.g. randomized gambling games (e.g. so-called slot games), electronic casino games (e.g. roulette, poker, black jack, etc.), betting games, lottery games, sports betting, etc. Such a connection can for example be referred to as amusement game session or gaming session. During such a gaming session or amusement game session, so-called slot games and/or casino games can then for example be played on the client unit, sports bets be placed via the client unit or betting or lottery games used on the client unit.

In a server-based amusement game system, gaming terminals are usually used as client units. A gaming terminal is a special version of an amusement machine as it comes as stand-alone device and either only runs a respective operating system or one operating system in conjunction with different amusement game contents (e.g. game logic and graphics). Process and control in accordance with the legal requirements for the amusement games of the gaming terminal are however conducted by the central server unit. A special form of gaming terminals are so-called video lottery terminals or VLTs, allowing in particular the respectively responsible agencies to monitor the played games while applying a control function.

In addition to the usual amusement machines and/or gaming terminals usually encountered in location-specific gaming locations, casinos, etc., especially so-called interactive amusement game solutions (e.g. interactive online gaming, online casinos, online bets, lottery games via Internet, etc.) have been developed that make available amusement games for one or several players. Due to advancements in information and communication technologies, the interactive amusement game solutions are offered by integrating state-of-the-art communication networks (e.g. Wi-Fi, cellular network, digital data network, etc.) via Internet or wireless Internet and can thus be used on terminal devices such as personal computers (PC), laptops, tablet PCs or smartphones. The amusement games (e.g. gambling, casino games, betting games, lottery games, sports bets, etc.) can then be used in an amusement game session following the completed registration and login process with a so-called online gaming platform using the respective terminal device. Normally, these interactive amusement game solutions are also based on the client server concept—e.g. using a central online gaming platform as server unit and the respective terminal devices (e.g. PC, laptop, smartphone, etc.) as client units.

Thanks to the development of online gaming platforms and/or server-based amusement game systems, the utilization of amusement games, such as slot games, casino games, betting games, lottery games, sports bets, etc. has in the meantime been approved for various channels and/or various terminal devise (e.g. gaming terminal, tablet PC, smartphone, web-based via PC, etc.) in addition to the traditional amusement game devices and/or betting devices. This for example allows making available to users the same location-based amusement games via the Internet or Wi-Fi as are available on amusement machines and/or gaming terminals at casinos. A gaming terminal or amusement machine can for example enable the use of a certain amusement game via usage of a client or player card. The same amusement game can, however, also be played following a registration process at an online gaming platform with user-specific terminal devices, such as PC, laptop, tablet PC or smartphone. However, due to various regulations (e.g. legal regulations, necessary user data for identification, etc.), user-specific data, such as client card used on the amusement machine or gaming terminal e.g. for registration or user identification prior to an amusement game session, are usually not networked with the user-specific data, such as the player and user account or user profile for web-based or Wi-Fi usage.

It therefore becomes very cumbersome to the user to e.g. change from one game on a casino gaming terminal to an online version of that game on a cellular terminal device once e.g. the respective gaming terminal at the casino—or the casino itself—has been departed.

Normally, a logout at the server-based amusement game system is first required for terminating the current amusement game session at e.g. the gaming terminal as client unit, which will in turn allow switching to the terminal device as client unit. This, however, has the disadvantage that it will require a new login on the e.g. mobile terminal device as a new client unit so that the desired amusement game and respective amusement game session can be resumed. This changes the status and the course of the amusement game. For example, the slot combination of the game most recently displayed at the gaming terminal and/or on the client unit, the current casino game position, etc. is altered by the login on the new terminal device and/or on the new client unit. Furthermore, advantages accumulated during the previous run of the amusement game session, such as free games, bonus points, a current gambling feature snapshot and/or credits, etc. might be lost. Due to the login at the new terminal devices and/or on the new client unit, a new amusement game session will in particular be launched, thereby in principle starting the desired amusement game anew on the new terminal device and/or new client unit. A user can thus e.g. complete a started amusement game session at the respective terminal and/or the respective client unit of the server-based amusement system or lose e.g. certain acquired advantages and/or the current status of the amusement game session, due to the change of the terminal device and/or client unit, especially due to the interruption of the amusement game session caused by the process of logging off and on.

Document WO 2014/052259 A1 describes for example a method for a cross-platform amusement game session, whereas a mobile terminal device is used. Here, the mobile terminal device is connected with the respective amusement game device on which the current amusement game session is conducted. The current amusement game session can be transferred from the amusement game device to the mobile terminal device, then continued there when leaving the close range of the amusement game device. A deflector module interposed between the gaming server and the amusement game device is used here. It deflects a video stream of the respective amusement game session from the gaming server to the mobile terminal device. Should the user prefer to once again play on the amusement game device, the deflection of the amusement game session can be reversed. The method described in document WO 2014/052259 A1 however has the disadvantage that during usage of a mobile terminal device and/or for as long as the amusement game session is deflected to the mobile terminal device, the amusement game device itself is blocked. The amusement game device can therefore not be used by other players or for other amusement games. Furthermore, this method inserts an additional component between server and amusement game device and/or client, thus resulting in additional installation and maintenance efforts.

SUMMARY OF THE INVENTION

The present invention is therefore presented with the task of specifying a method of the above-indicated type by which the disadvantages of the state-of-the-art can be avoided and by which, without any additional effort, amusement game sessions can be transferred with the respective current status and without interruption among the various terminal devices and/or client units within a server-based amusement game system.

According to the invention, the task is solved by a method of the above-indicated type via the characteristics of the independent claims. Advantageous embodiments of the present invention are described in the dependent claims.

According to the invention, the task is solved via a method of the above-indicated type, for which centrally stored, user-specific data for an amusement game session performed on a server unit of a server-based amusement game system and displayed on a first client unit of the server-based amusement game system are reviewed and an identification of the first client unit is stored together with the user-specific data or as part of the user-specific data. The fact that the amusement game session is performed on a server unit and displayed on a client unit means that although a user can enter data for controlling the amusement game session on the client unit, the client unit cannot use these user input data for controlling the amusement game session but instead transmits the input data and/or respective information to the server unit so that, then, the server unit conducts the actual control of the amusement game session according to the user input. If during the amusement game session, a change of the amusement game session display to a second client-.unit of the server-based amusement game system is requested, the identity of the first client unit is displayed on e.g. the display unit of the initial client unit. This identification of the first client unit can then be entered into the second client unit. Furthermore, a status of the amusement game session at the time of the change request is recorded on the server unit and the amusement game session is frozen in that status. The second client unit establishes a communication connection to the server unit, whereas an identification of the second client unit is sent to the server unit and stored together with the user-specific data. Following the establishment of the communication connection between the second client unit and the server unit, the identification of the first client unit is deleted from the user-specific data and the amusement game session is continued at the status recorded on the server unit and is displayed on the second client unit. Then the communication connection to the server unit of the first client unit is terminated and the first client unit is released.

The main aspect of the solution according to the invention consists in transferring an ongoing amusement game session without interruption or loss of a current status from a first client unit and/or terminal device to a second, different client unit and/or other terminal device of a server-based amusement game system, so that the status of the display continued on the second client unit corresponds to the status of the display on the first client unit at the time of halting the amusement game session. An ongoing amusement game session can thus for example be transferred from one client unit to another client unit while waiting for e.g. a user interaction during an ongoing amusement game session within an amusement game application or while e.g. a game result of the used amusement game application is being determined. The current amusement game session is maintained by the server unit and/or e.g. a special application on the server unit while switching from the first to the second client unit whereas the user is actively logged in during the entire process. For maintaining the amusement game session, the status of the amusement game session is recorded on the server unit, i.e. all information necessary for continuing the amusement game session following a possible interruption are stored on the server unit. The recorded status thus comprises the parameters necessary for executing an amusement game, such as player account balances, information regarding the current game situation (in which phase or which section the amusement game is situated) and whether the input of the player is being awaited or whether output should occur.

Furthermore, the recorded status can also comprise advantages, such as free games, bonus points, etc. acquired during the course of the amusement game session.

The amusement game session will consequently be transferred from the current status to the second client unit, where user and/or player can continue it without interruption. By networking the user-specific data with the identification of the respectively updated client unit, the server unit is at all times aware of the respectively current client unit with regard to the display of the current amusement game session. Neither a new login and/or login process on the second client unit by the user is required, nor does the user lose any advantages (e.g. bonus points, game credits, free games, etc.) acquired during the current amusement game session. An additional advantage of the solution according to the invention consists in the release of the first client unit following the successful transfer of the current amusement game session to the second client unit. The connection of the first client unit to the server unit will thus be terminated without e.g. any logout and/or logout process by the user. The first client unit can thus be used e.g. by users for a new amusement game 2 session. Any connection to the previous user is terminated.

It is advantageous if during the login and/or during the login process of the first client unit with the server unit—before the respectively current amusement game session has started—the identification of the first client unit is stored with the centrally stored, user-specific data. Normally, the utilization of a server-based amusement game system requires mostly a one-time registration where, depending on the respective legal, administrative and/or technical requirements, user-specific data, e.g. in form of a client card, a user account or user and/or player profile, are centrally stored in the amusement game system. These user-specific data can be advantageously stored e.g. in a central storage unit of the server unit or in a database attributed to a server unit. For using and/or establishing an amusement game session, the user must then for example log in and/or undergo a login process on the respective client unit. The user is required to enter, e.g. via a user interface of the respective client unit, user-specific login data to be processed to the server unit for purposes of matching with the respectively stored user-specific data. If the entered login data and the respective user-specific data match, a connection between the client unit and the server unit is established and an amusement game session can start. When transferring the login data to the server unit, it is possible to send along to the server unit—preferably in the background and/or without user interaction—the identification of the recently used client unit. When verifying the user data, the client unit identification can be easily stored with the user-specific data—e.g. in the user account or the user profile.

Throughout, it is advantageous to use a unique, device-specific identification for identifying the respective client unit. Depending on the utilized or used client unit, unique device-specific data, such as serial number, licensing number, operating number or unique hardware address can be entered as client unit for gaming terminals; or e.g. a so-called media access control or MAC address for e.g. wireless terminal devices such as smartphones, tablet PCs, laptops, etc. or, for PCs, as client unit. A MAC address is a hardware address that enables a communication or computer network to clearly identify a terminal device. Via the utilization of a unique, device-specific identification, the client unit can be clearly identified in the server-based amusement system, thus enabling clear identification by the server unit. The client unit can therefore be clearly addressed when communication is established or during the communication connection and the ongoing amusement game session.

In a preferred embodiment of the method according to the invention, a status of the ongoing amusement game session currently displayed on the first client unit is fixed onto the second client unit upon change request of the amusement game session; i.e. the current amusement game session, from that moment on and/or from the moment of identification from the first client unit onto the second client unit, is frozen in the current status, whereas such halting can be visualized to user e.g. by temporarily freezing a graphic display of the current amusement game at the current status, such as spinning slots, turning roulette wheel, presentation of a free game, fixing a current decision in the course of the game, etc. on the display unit of the first client unit. This freezing and/or fixation can for example occur following successful transfer of the amusement game session to the second client unit or following the interruption of the change request, thus enabling to continue the course of the game without interruption.

For establishing the communication connection between the second client unit and the server unit, it is ideally possible to request entry of a user-specific identification on the second client unit. Due to safety or player protection reasons, the user can for example request entry of a personal identification number and/or pin or biometric data (e.g. finger print, etc.). Thus, it is possibly to prevent by very easy means that an ongoing amusement game session is transferred to a second client unit by an unauthorized user (e.g. under-age, non-registered or blocked user, etc.) or that any transfer to e.g. non-registered and/or unauthorized client units occur.

It is appropriate that prior to deleting the identification of the first client unit from the user-specific data and prior to terminating the communication connection between the first client unit and the server unit, the user be prompted and/or required to confirm the switch to the second client unit. The user will thus be able to easily transfer the amusement game session currently running on the first client unit to the second client unit via confirmation; or to abort it. If the user does not enter a client unit switch confirmation and/or the amusement game session is aborted, the identification for the second client unit will once again be removed from the user-specific data. The identification of the first client unit remains stored with the user-specific data and the amusement game session is continued without interruption on the first client unit and at the current status.

It is advantageous if the identification of the respective client unit and/or the first client unit is displayed as so-called QR code, as barcode or as alphanumeric code. The representation as OR and/or Quick Response code or barcode makes it possible for the user—provided the second client unit has been set up this way—to enter the identification in the second client unit in a simple manner, e.g. via scanning or swiping. This avoids e.g. erroneous entries or typos, as can occur for alphanumeric codes. Especially QR codes provide a method for representing and/or displaying information so that they can be found very quickly by automation and read and/or displayed. The representation of the identification as alphanumeric code provides a flexible option for code entry since an alphanumeric code can usually be entered very easily via a user interface on the respective client unit. The client unit does not require special setup for inputting alphanumeric codes. It for example does not have to have a camera or sensor for detecting the code.

A server-based amusement game system can preferably integrate different terminal devices as client units. Gaming terminals, video lottery terminals, mobile terminal devices (e.g. smartphones, tablet PCs, laptops or PCs) can be used as client units in a simple manner. The respectively used client units can be offered for different uses of amusement games. Especially location-specific amusement game sessions e.g. in gaming venues or casinos can be established via gaming terminals, while mobile terminal devices can be used for wireless usage or laptops and/or PCs for online usage. Thanks to the method according to the invention, an amusement gaming session can be transferred without interruption and flawlessly e.g. from a gaming terminal to a wireless terminal device (e.g. smartphone) and from there to a personal computer. Likewise, a user may take an amusement gaming session e.g. from a wireless terminal device, into a casino, where it can be continued on a gaming terminal without losing the respectively current status.

Establishing communication connections between the client units and the server unit as well as from the respective sessions will take place via a communication network. A wired and/or wireless communication network or combination of wired and wireless communication network, depending on the used client unit, preferably serves as overall communication network. For connecting the server unit and the gaming terminal, local wired networks or also e.g. a Wi-F network can be used. For the communication connection between the server unit and a wireless terminal device, a wireless network (e.g. 3G, LTE, etc.) and the so-called wireless Internet or a connection set-up via Wi-Fi can be also used. If, for example, a connection to a server unit is established via a PC, respective data networks and the Internet can for example be used for communication. Depending on the respective requirements to the server-based amusement game system and the respectively used client units, different versions and combinations of communication networks are conceivable as connection between the server unit and client unit.

For a preferred further development of the invention, the so-called Windows system services is used for the communication connections between server unit and the respective client units. Windows system services are special programs and/or services running in the background and bundling functionalities in order to make them available to third parties.

DESCRIBED EMBODIMENTS

Figure 2:
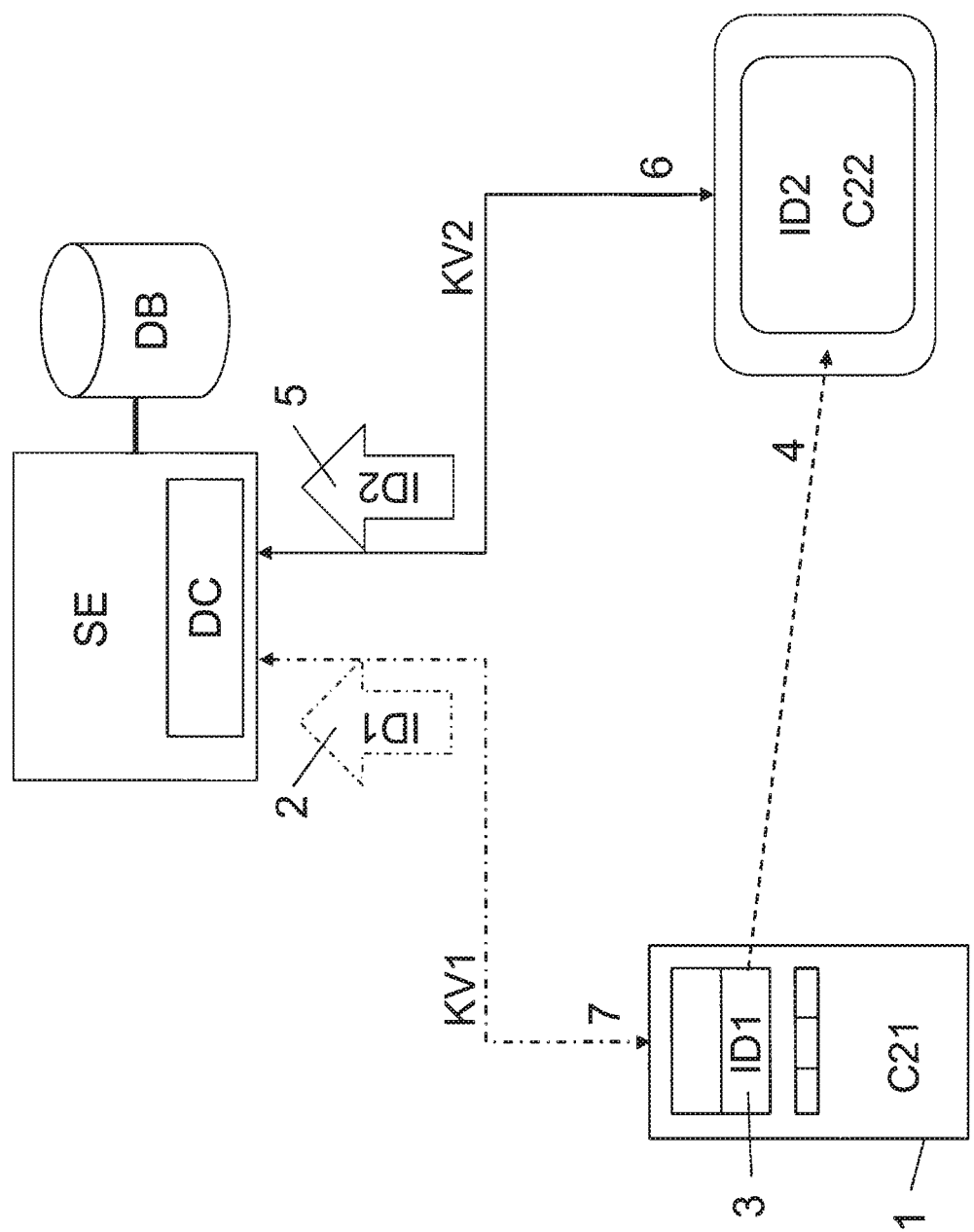

The invention will be further explained below using preferred embodiments and related illustrations. The illustrations show:

FIG. 1: in schematic representation, an exemplary server-based amusement game system FIG. 2: schematically and exemplary, the flow of a method for transferring an amusement game session between client units in an exemplary server-based amusement game system FIG. 1 illustrates, in a schematic manner, an exemplary amusement game system conceived as server-based and/or according to the client-server concept. It has been set up for playing by various client types—e.g. location-specific amusement game terminals, web-based access or via wireless terminal devices—as client units.

The exemplary amusement game system consists at least of one server unit SE and various client units C11, C12, C13, C14. Communication connections are established by the client units C11, C12, C13, C14 over a communication network KN for the respective amusement game sessions and, where applicable, other sessions (e.g. for administration purposes, installations, registration processes, etc.). As communication network KN, it is thereby possible to use a wired, a wireless or a combination of wired and wireless communication network KN—mainly depending on the type of the respective client unit C11, C12, C13, C14. Connections of client units C11, C12, C13, C14 under at least partial usage of public data or wireless networks (e.g. 3G, LTE, etc.) are for example conceivable in case of large-scale and/or regional or so-called remote access to server unit SE. For communication it is possible throughout to e.g. use the Internet and/or its services and/or protocols (e.g. FTP; HTTP; HTTPS). For location-specific and/or local extensions of connections between server unit SE and the respective client units C11, C12, C13, C14 (e.g. inside a casino), a so-called local area network (LAN such as, typically, a wired Ethernet and/or wireless LAN) can be used as wireless connection.

It is possible to access the server unit SE for establishing communication connections and/or amusement game sessions of various types of client units C11, C12, C13, C14. To this end, respective client software or applications for client functionality is usually installed on the respective client units C11, C12, C13, C14, thus identifying and making usable the respective client units C11, C12, C13, C14 in the server-based amusement gaming system. Gaming terminals C11 can for example be used as client units C11, C12, C13, C14. A gaming terminal C11 can be used e.g. location-specific inside a casino. Gaming terminal C11 is usually conceived as stand-alone device, whereas only one respective operating system or one operating system alongside various amusement games (e.g. game logic and graphics) are filed on a gaming terminal C11. Controls and processes of amusement games played on gaming terminals are conducted by server unit SE. Furthermore, wireless terminal devices C12, C13, such as smartphones, table PCs or laptops can be intended as client units on which amusement game sessions can be conducted e.g. via location-specific wireless Internet. Furthermore, it is also possible to use a PC as client unit C14 e.g. for so-called interactive online gaming via an Internet connection to the server unit.

Server unit SE, to which client units C11, C12, C13, C14 can request and establish a connection for amusement game sessions, can for example comprise various functional units. These functional units can for example be stored on one or several computer units, whereas the FIG. 1 does not show these functional units for simplicity reasons. Server unit SE can for example comprise a web server for connection to the Internet, a server for management of platforms and/or user accounts, a game server, a content server, etc. The game server comprises in particular the random generator and the so-called game mechanics, which serves to determine, on the basis of the rules of the game, game processes and outcomes as a function of the random generator. The content server can for example administer game contents and make them available.

Furthermore, the server unit SE may comprise a server unit DB or a database DB is attributed to server unit SE where e.g. user-specific data (e.g. user accounts, user profiles), game contents, administration data, etc. can be filed. User-specific data (e.g. user accounts, user profiles) can for example be set up and stored during a registration process prior to the first amusement game session. This for example allows to check legal requirements and/or game protection provisions while filing user-specific data such as e.g. personal data (e.g. name, age), login data (e.g. password, PIN, biometric data), payment information (e.g. credit card data) and other necessary user-specific data centrally in the storage unit and/or database DB.

FIG. 2 also illustrates the exemplary server-based amusement game system from FIG. 1 alongside a server unit SE, which is attributed to a storage unit and/or database DB, as well as two exemplary client units C21, C22.

Communication connections KV1, KV2 between server units SE and client units C21, C22 can, in turn, be set up via a communication network KN. An exemplary first client unit C21 is, for example, a gaming terminal, to which a first identification ID1 has been attributed. A second client unit C22 constitutes, for example, a wireless terminal device (e.g. a smartphone or tablet PC), to which a second identification ID2 has been attributed. As first and/or second identification ID1, ID2 for the respective client units C21, C22, unique, device-specific identifications are used, allowing to clearly identify client units C21, C22 within a communication network KN and/or a computer network. Such a unique, device-specific identification ID1, ID2 is for example provided by the so-called media-access-control or MAC address, which can for example be used for wireless terminal devices or PCs, as client unit C22. Device-specific unique data, such as serial numbers, license numbers, operating number or other unique hardware identifications—e.g. for gaming terminals C21 as client units—can however also be used as identifications ID1, ID2.

During a first method step 1 for a current amusement game session that should be conducted and displayed on the first client unit C21, user-specific data (e.g. login data) are being checked. This check can occur for example during a user login process prior to the current amusement game session. To this end, user-specific login data (e.g. user name, password, PIN, biometric data, personal data stored on a user card) are entered on the first client unit C21 and compared with e.g. user-specific data from a user account for example, which are stored centrally in the database DB attributed to the server unit SE. In case of a match of the entered login data with the stored, user-specific data, a communication connection KV1 between the server unit SE and the first client unit C21 is established. The amusement game session can then be started. In a second method step 2, the corresponding first identification ID1 from the first client unit C21 is being transmitted via a communication connection KV to server unit SE as part of e.g. a background process during a login process. The first identification ID1 of the first client unit C21 will then be stored alongside the user-specific data (i.e. in user account in database DB attributed to server unit SE, for example). This establishes a networking between the user account and the first client unit C21, on which the currently requested amusement game session should be displayed.

In a third method step 3, a change to the second client unit C22 is requested. This can for example occur via an entry on the second client unit C22 via a user interface (e.g. touchscreen, enter key) at any point during the current amusement game session. Identification ID1 of the first client unit X21 is displayed on the first client unit C21 (e.g. a display unit of first client unit C21). The identification display of the first client unit can for example occur as so-called QR code, Alternatively or additionally, displaying identification ID1 of the first client unit C21 is for example also possible as alphanumeric code and/or as barcode.

In a fourth method step 4, identification ID1 of the first client unit C21 is entered into the second client unit C22, on which the current amusement game session is to be transferred. It is for example possible to scan identification ID1 of the first client unit C21, displayed as QR code or barcode, via the display unit of the first client unit C21 using an optical sensor (e.g. smartphone camera). The scanned identification ID1 of the first client unit can then be analyzed accordingly by the second client unit C22. If the second client unit C22 is for example not set up for scanning the first identification ID1, identification ID1 of the first client unit C21 can for example also be entered into the second client unit C22 in the form of an alphanumeric code. Furthermore, the status of the current amusement game session indicated and/or displayed on the display unit of the first client unit C21 is frozen. This means that the current status of the amusement game session and the current amusement game session are halted by server unit SE and/or by a special application for the client change DC on server unit SE. This can be displayed to the user of the display unit of the first client unit C21 e.g. via a freezing of the graphic display of the current amusement game session status. A current slot run, a turning roulette wheel, a currently displayed bonus game, etc. of an ongoing game for example continues "perpetually" or is e.g. optically frozen. Due to freezing, losing the current game status of the amusement game session (e.g. free games, bonus points, credits) is avoided.

During a fifth method step 5—following entry of identification ID1 of the first client unit C21 on the second client unit C22—an identification ID2 of the second client unit C22 to the server unit SE and/or the application for client change DC located on server unit SE is transmitted for example during a background process. Server unit SE and/or the application for the client change DC will then add identification ID2 of the second client unit C22 to the user-specific data, which are available for the current amusement game session on the first client unit C21 on database DB and/or server unit SE. During the fifth method step 5, the second client unit C22 will establish a communication connection KV2 to server unit SE. During the fifth method step 5, it is optionally possible to request an additional user-specific identification (e.g. a PIN, biometric data) for setting up the communication connection KV2 between server unit SE and the second client unit C22 due to safety reasons, which will then be entered into the second client unit C22.

During a sixth method step 6, it is optionally possible to initially request a confirmation for the transfer of the current amusement game session from the first client unit C21 (e.g. gaming terminal) to the second client unit C22 (e.g. the wireless terminal devices such as a smartphone). This confirmation is entered into the first client unit C21. If no confirmation occurs or if the transfer process is being interrupted, identification ID2 of the second client unit C22 is deleted from the user-specific data, the freezing of current status of the amusement game session is terminated and the amusement game session is continued without status change and/or interruption on the first client unit.

Should the change to the second client unit C22 be confirmed during the sixth method step 6, identification ID1 of the first client unit C21 is deleted from the user-specific data by server unit SE and/or by the application for client change DC. Via an entry of identification ID2 into the user-specific data and/or the user account, only the second client unit C22 will from now on be linked to the user account and, therefore, the current amusement game session. The current amusement game session is transferred to the second client unit C22 and displayed there. This means that the amusement game session can be continued without interruption with the same status as was achieved during freezing upon change request to the second client unit. During a seventh method step 7, the first client unit C21 is released by server unit SE and/or the application for client change DC and the respective communication connection KV1 is terminated. The first client unit C21 can now be used for a new amusement game session by a different user.

The current amusement game session is displayed on the second, user-selected client unit C22 and can be continued there, whereas the advantages already reached on the first client unit C21 (e.g. credit, bonus points, free gams, bonus games) are maintained. As described in FIG. 2, the user can thus for example begin an amusement game session on a gaming terminal C21 at a casino and continue playing and/or take along the current amusement game session on a second wireless client unit C22 (e.g. smartphone, tablet PC) upon leaving the casino. It is also conceivable that the amusement game session of the second wireless client unit C22 is transferred to another client unit (e.g. PC). A re-transfer to the first client unit C21 is also possible. Furthermore, it is also possible that a user starts an amusement game session e.g. on a PC or a wireless terminal device and then takes it along inside a casino, only to transfer it to another client unit there, such as a gaming terminal, in order to experience e.g. the optical effects of the respective game on a greater display unit.

The invention claimed is:

1. A method for transferring an amusement game session between client units (C11, C12, C13, C14, C21, C22) in a server-based amusement game system comprising at least one server unit (SE) and at least two client units (C11, C12, C13, C14, C21, C22), whereas communication connections (KV1, KV2) are being established between the server unit (SE) and the at least two client units (C11, C12, C13, C14, C21, C22) via a communication network (KN), characterized in that, for an amusement game session conducted on the server unit (SE) and displayed on a first client unit (C21), centrally stored, user-specific data are reviewed (1) and an identification (ID1) of the first client unit (C21) is being stored together with user-specific data (2), that, upon a request for a change of the amusement game session display on a second client unit (C22), the identification (ID1) of the first client unit (C21) is displayed (3) on the first client unit (C21) and entered (4) on the second client unit (C22), that, at the time of the change request, a status of the amusement game session is recorded on the server unit (SE) and the amusement game session is frozen in this status, that a communication connection (KV2) is established from the second client unit (C22) to the server unit (SE) and an identification (ID2) of the second client unit (C22) is stored together with user-specific data (5), that, upon setup of the communication connection (KV2) between the second client unit (C22) and the server unit (SE), the identification (ID1) of the first client unit (C21) is deleted from the user-specific data and the amusement game session is continued from the status as frozen on the server unit (SE) and displayed (6) on the second client unit (C22), and that a communication connection (KV1) of the first client unit (C21) to the server unit (SE) is terminated and the first client unit (C21) is released (7).

2. The method according to claim 1, characterized in that, prior to beginning of the amusement game session and during a login process of the first client unit (C21) to the server unit (SE), the identification (ID1) of the first client unit (C21) is stored together with the user-specific data (1).

3. The method according to claim 2, characterized in that an input of a user-specific identification is requested (5) on the second client unit (C22) with regard to the setup of the communication connection (KV2) between the second client unit (C22) and the server unit (SE).

4. The method according to claim 2, characterized in that, prior to deleting the identification (ID1) of the first client unit (C21) and prior to terminating the communication connection (KV1) between the first client unit (C21) and the server unit (SE), a confirmation for the change to the second client unit (C22) is requested (6) for entry on the first client unit (C21).

5. The method according to claim 2, characterized in that the amusement game session comprises an amusement game and the frozen status of the amusement game session comprises parameters for executing the amusement game.

6. The method according to claim 2, characterized in that the frozen status of the amusement game session comprises advantages acquired during the course of the amusement game session.

7. The method according to claim 1, characterized in that an input of a user-specific identification is requested (5) on the second client unit (C22) with regard to the setup of the communication connection (KV2) between the second client unit (C22) and the server unit (SE).

8. The method according to claim 3, characterized in that, prior to deleting the identification (ID1) of the first client unit (C21) and prior to terminating the communication connection (KV1) between the first client unit (C21) and the server unit (SE), a confirmation for the change to the second client unit (C22) is requested (6) for entry on the first client unit (C21).

9. The method according to claim 3, characterized in that the amusement game session comprises an amusement game and the frozen status of the amusement game session comprises parameters for executing the amusement game.

10. The method according to claim 7, characterized in that the frozen status of the amusement game session comprises advantages acquired during the course of the amusement game session.

11. The method according to claim 1, characterized in that, prior to deleting the identification (ID1) of the first client unit (C21) and prior to terminating the communication connection (KV1) between the first client unit (C21) and the server unit (SE), a confirmation for the change to the second client unit (C22) is requested (6) for entry on the first client unit (C21).

12. The method according to claim 11, characterized in that the amusement game session comprises an amusement game and the frozen status of the amusement game session comprises parameters for executing the amusement game.

13. The method according to claim 11, characterized in that the frozen status of the amusement game session comprises advantages acquired during the amusement game session prior to the frozen status.

14. The method according to claim 1, characterized in that the amusement game session comprises an amusement game and the frozen status of the amusement game session comprises parameters for executing the amusement game.

15. The method according to claim 14, characterized in that the frozen status of the amusement game session comprises advantages acquired during the amusement game session prior to the frozen status.

16. The method according to claim 1, characterized in that the frozen status of the amusement game session comprises advantages acquired during the amusement game session prior to the frozen status.

17. The method according to claim 1, characterized in that the identification (ID1) of the first client unit (C21) is displayed (3) on the first client unit (C21) in the form of at least one of an alphanumeric code or as barcode.

18. The method according to claim 17, further comprising scanning the displayed identification (ID1) of the first client unit (C21) with a camera on the second client unit (C22).

19. The method according to claim 1, further comprising an additional request for user-specific identification for setting up the communication connection (KV2) between server unit SE and the second client unit (C22).

20. The method according to claim 19, characterized in that user-specific identification comprises one of a personal identification number (PIN) or biometric data.

\* \* \* \* \*